(12) United States Patent
Huang et al.

(10) Patent No.: US 8,896,704 B2
(45) Date of Patent: Nov. 25, 2014

(54) TESTING METHOD AND TESTING APPARATUS FOR TELEVISION SYSTEM

(75) Inventors: Ching-Chun Huang, Hsinchu County (TW); Yu-Fen Tsai, Yilan County (TW)

(73) Assignee: MStar Semiconductor, Inc., Hsinchu County (TW)

( * ) Notice: Subject to any disclaimer, the term of this patent is extended or adjusted under 35 U.S.C. 154(b) by 0 days.

(21) Appl. No.: 13/615,962

(22) Filed: Sep. 14, 2012

(65) Prior Publication Data

US 2013/0314551 A1    Nov. 28, 2013

(30) Foreign Application Priority Data

May 25, 2012    (TW) .............................. 101118853 A

(51) Int. Cl.
H04N 17/00    (2006.01)
H04N 17/02    (2006.01)
H04N 7/00     (2011.01)
H04N 11/00    (2006.01)
G06F 9/44     (2006.01)

(52) U.S. Cl.
USPC ........... 348/180; 348/177; 348/184; 348/552; 348/553; 717/168

(58) Field of Classification Search
USPC ......... 348/177, 178, 180–181, 184, 187, 189, 348/552–553; 717/168
See application file for complete search history.

(56) References Cited

U.S. PATENT DOCUMENTS

| | | | |
|---|---|---|---|
| 4,724,484 A * | 2/1988 | Ward | 386/263 |
| 6,532,592 B1 * | 3/2003 | Shintani et al. | 725/141 |
| 6,741,277 B1 * | 5/2004 | Rau | 348/181 |
| 6,847,395 B2 * | 1/2005 | Thomas et al. | 348/180 |
| 7,425,992 B2 * | 9/2008 | Feeler et al. | 348/553 |
| 7,929,056 B2 * | 4/2011 | Tang et al. | 348/556 |
| 8,171,512 B2 * | 5/2012 | Song | 725/37 |
| 8,324,909 B2 * | 12/2012 | Oakes et al. | 324/555 |
| 2003/0137587 A1 * | 7/2003 | Braun | 348/181 |
| 2004/0041746 A1 * | 3/2004 | Allen et al. | 345/3.4 |
| 2004/0196250 A1 * | 10/2004 | Mehrotra et al. | 345/102 |
| 2005/0073530 A1 * | 4/2005 | Kapur et al. | 345/594 |
| 2005/0125357 A1 * | 6/2005 | Saadat et al. | 705/57 |
| 2005/0149969 A1 * | 7/2005 | Kumar et al. | 725/40 |
| 2006/0212923 A1 * | 9/2006 | Soneira | 725/151 |
| 2006/0230312 A1 * | 10/2006 | Nichols et al. | 714/25 |
| 2006/0271977 A1 * | 11/2006 | Lerman et al. | 725/88 |
| 2007/0261046 A1 * | 11/2007 | Miller | 717/168 |
| 2008/0127166 A1 * | 5/2008 | Cockburn et al. | 717/173 |
| 2009/0031387 A1 * | 1/2009 | Boyden et al. | 725/132 |
| 2009/0049504 A1 * | 2/2009 | Lu | 725/141 |
| 2009/0244290 A1 * | 10/2009 | McKelvey et al. | 348/181 |
| 2009/0271533 A1 * | 10/2009 | Asnaashari | 710/13 |
| 2009/0315998 A1 * | 12/2009 | Garg | 348/177 |
| 2010/0023777 A1 * | 1/2010 | Prevost et al. | 713/180 |
| 2010/0058421 A1 * | 3/2010 | Hastings et al. | 725/116 |
| 2010/0208136 A1 * | 8/2010 | Castano | 348/553 |
| 2012/0072896 A1 * | 3/2012 | Watanabe et al. | 717/170 |
| 2012/0079473 A1 * | 3/2012 | Watanabe et al. | 717/170 |
| 2013/0147967 A1 * | 6/2013 | Tsai et al. | 348/181 |
| 2013/0191513 A1 * | 7/2013 | Kamen et al. | 709/219 |

* cited by examiner

Primary Examiner — Brian Yenke
(74) Attorney, Agent, or Firm — WPAT, PC; Justin King

(57) ABSTRACT

A testing apparatus, coupled to a mobile storage device, includes a control module and an intermediate module. The intermediate module, coupled to a television system and the mobile storage device, is for switching a subordinate status of the mobile storage device. The control module controls the intermediate module to write target data into the mobile storage device, and to allow the mobile storage device to output the target data to the television system.

4 Claims, 5 Drawing Sheets

TESTING METHOD AND TESTING APPARATUS FOR TELEVISION SYSTEM

This application claims the benefit of Taiwan application Serial No. 101118853, filed May 25, 2012, the subject matter of which is incorporated herein by reference.

BACKGROUND OF THE INVENTION

1. Field of the Invention

The invention relates in general to a testing technique, and more particularly, to an automated testing technique for a television system.

2. Description of the Related Art

Accompanied with the prosperity of various electronic products, multimedia systems such as home theaters are now prevalent in households. In many multimedia systems, a most important hardware device is an image display apparatus. Therefore, methods for ensuring products achieve expected functions when leaving the factory have long been a focus to which image display apparatus manufacturers pay much attention. In order to effectively prevent product refunds and exchanges as well as increase consumer satisfaction, malfunctioning products need to be first screened out and repaired before being shipped out.

For a television system having firmware that can be updated through a mobile storage device (e.g., a USB portable disk), test items usually include testing the connection between the television system and a mobile storage device to acquire updated firmware accordingly. A current testing method is usually manually performed by a testing staff. That is, the testing staff manually inserts a mobile storage device into a television system, and observes with the naked eye whether a corresponding updating message shows on the television system.

Another common test item is determining whether a television system remains functional after multiple times of powering on and off. Similarly, such test item is also manually performed by testing staff. That is, the test staff manually powers on and off a television system for a number of times, and observes with the naked eye whether the television system operates correspondingly.

However, with current testing methods, manufacturers of television systems can only randomly test a small part of products with limited human resources. As a result, an original testing intention of practicing comprehensive preventive measures is hardly achieved.

SUMMARY OF THE INVENTION

The invention is directed to a testing apparatus and testing method for a television system. Compared to a conventional solution, by automating and integrating majority of test procedures, the testing apparatus and testing method of the present invention is capable of saving a large amount of human resources and thus increasing overall testing efficiency.

According to an embodiment the present invention, a testing device for a television system is provided. The testing apparatus, coupled to a mobile storage device, includes an intermediate module and a control module. The intermediate module, coupled to the television system and the mobile storage device, switches a subordinate status of the mobile storage device. The control module, coupled to the intermediate module, controls the intermediate module to write target data into the mobile storage device and to allow the mobile storage device to output the target data to the television system.

According to another embodiment of the present invention, a testing method for a television system, a control module and a mobile storage device is provided. The method include steps of: setting the mobile storage device as a subordinate to the control module; writing target data from the control module into the mobile storage module; setting the mobile storage device as a subordinate to the television system to allow the television system to automatically read the target data from the mobile storage device.

According to another embodiment of the present invention, a testing apparatus for a television system is provided. The testing apparatus includes a control module and an intermediate module. A power cord of the television system is coupled to the intermediate module. The control module is coupled to the intermediate module, and controls the intermediate module to change a power supply status of the power cord for once or for a successive number of times.

According to yet another embodiment of the present invention, a testing method for a television system is provided. A power cord of the television system is coupled to an intermediate module. The method includes steps of: controlling the intermediate module to change a power supply status of the power cord for once or for a successive number of times; and confirming whether the television system correctly responds to the change in the power supply status.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
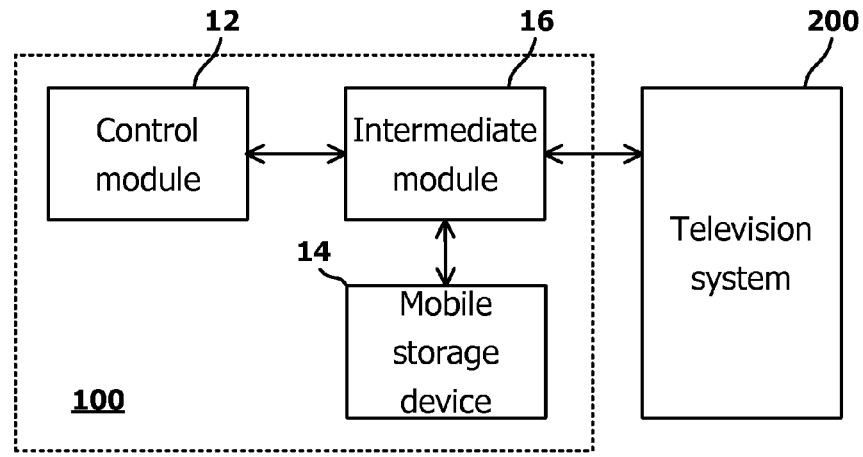
FIG. 1A is a block diagram of a testing apparatus according to an embodiment of the present invention.

FIG. 1A shows a testing apparatus 100 according to an embodiment of the present invention. The testing apparatus 100 includes a control module 12, a mobile storage device 14, and an intermediate module 16 coupled between the control module 12 and the mobile storage device 14. As shown in FIG. 1A, the mobile storage device 14 is also coupled to a television system 200. Taking a USB portable disk as the mobile storage device 14 for example, the intermediate module 16 may be provided with a USB slot for accommodating the mobile storage device 14.

In the embodiment, the intermediate module 16 is mainly in charge of switching a subordinate status of the mobile storage device 14. For example, if the mobile storage device 14 is a USB portable disk, the intermediate module 16 may be a testing circuit board equipped with a USB controller, and may switch the subordinate status of the mobile storage device 14 with a multiplexer.

Figure 1B:
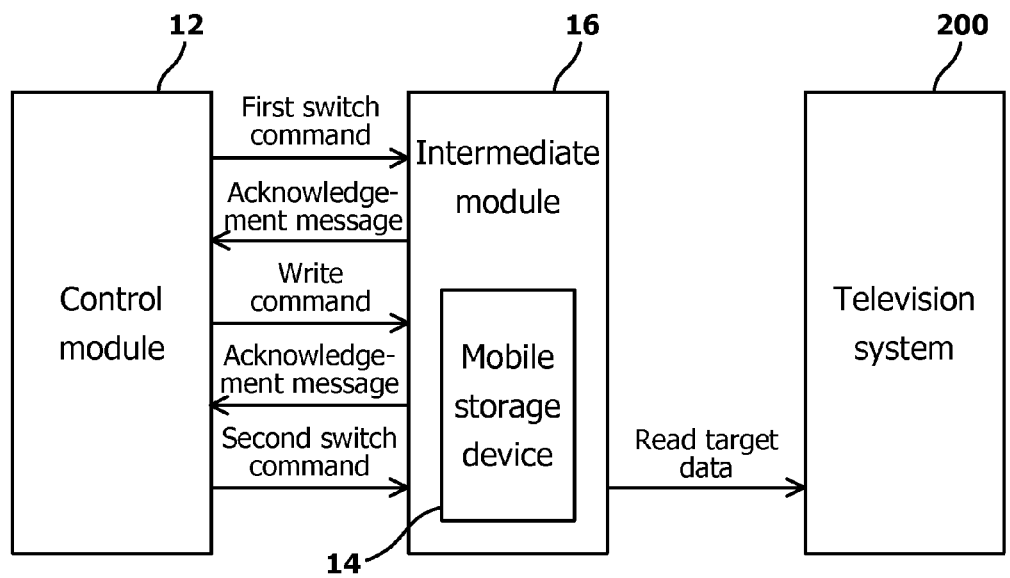
FIG. 1B is an exemplary flow of the testing apparatus.
Figure 1C:
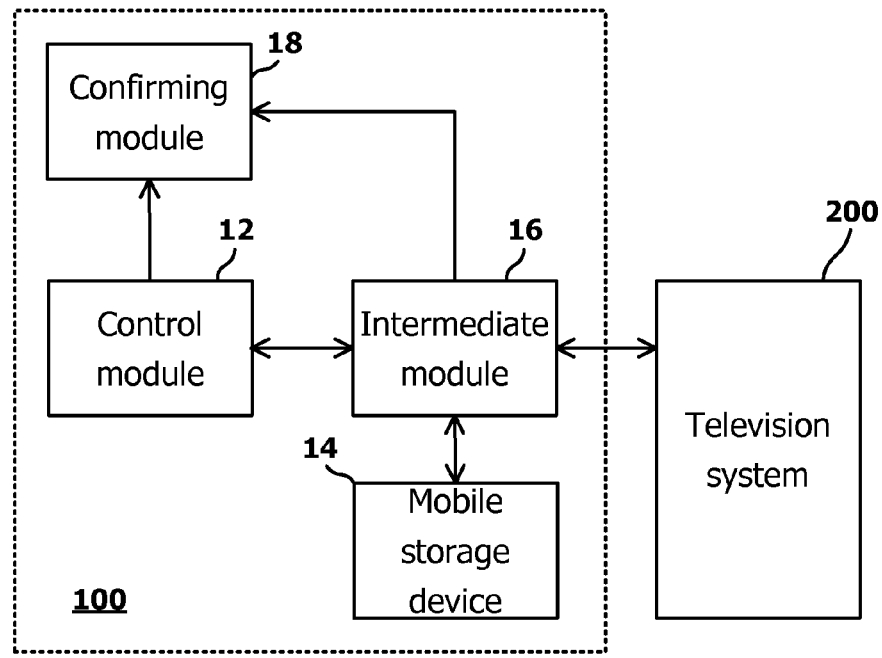
FIG. 1C is the testing apparatus further including a confirming module according to an embodiment of the present invention.

FIG. 1B shows an exemplary flow of the testing apparatus 100 according to an embodiment of the present invention. The control module 12 first sends a first switch command to the intermediate module 16, so as to control the intermediate module 16 to set the mobile storage device 14 as a subordinate to the control module 12. Under such condition, a television system 200 is unaware of the presence of the mobile storage device 14. After obtaining an acknowledgement message from the intermediate module 16 in response to the first switch command, the control module 12 writes target data (e.g., updated firmware) into the mobile storage 14 via the intermediate module 16. As the target data is written into the mobile storage device 14, the control module 12 sends a second switch command to the intermediate module 16, so as to control the intermediate module 16 to set the mobile storage device 14 as a subordinate to the television system 200. Thus, the television system 200 becomes aware of the presence of the mobile storage device 14 to automatically read the target data from the mobile storage device 14. That is, the mobile storage device 14 is enabled to output the target data to the television system 200.

In practice, the television system 200 may be designed, once the presence of the mobile storage device 14 is noticed, to automatically determine whether the mobile storage device 14 stores updated firmware, and to automatically execute an installation of the updated firmware when it is confirmed that the updated firmware is stored in the mobile storage device 14. Alternatively, the television system 200 may also be designed, once it is confirmed that the updated firmware is stored in the mobile storage device 14, to display a message on a display monitor to inquire whether a user wishes to install the updated firmware.

Referring to FIG. 10, the testing apparatus 100 may further include a confirming module 18 for confirming whether the target data is correctly written into the mobile storage device 14, and whether the television system 200 is capable of correctly and automatically reading the target data from the mobile storage device 14. For example, according to whether the mobile storage device 14 sends a confirmation message confirming the writing procedure is complete, the confirming module 18 determines whether the target data is correctly written into the mobile storage device 14.

In one embodiment, the television system 200 includes a built-in code cooperating with the testing procedure. The code generates a predetermined response signal after correctly reading the target data, and the response signal is sent back to the confirming module 18 via a data transmission interface (e.g., an RS-232 or USB interface) between the television system 200 and the intermediate module 16. Given that the predetermined response signal is correct, the confirming module 18 determines that the function of the television system 200 automatically reading data from the mobile storage device 14 is functional. Conversely, when the confirming module 18 does not receive the response signal or the received response signal is incorrect, the confirming module 18 determines that the function of the television system 200 automatically reading data from the mobile storage device 14 is malfunctional.

In another embodiment, the testing apparatus 100 may further include a capturing unit (not shown) for capturing a display image of the television system 200. For example, the television system 200 may be designed to display a predetermined image during and/or after the process of reading the target data. By comparing the captured result with a reference image, the testing apparatus 100 may determine whether the function of the television system 200 automatically reading the target data from the mobile storage device 14 and other functions to be tested are functional.

In practice, the control module 12 may be a computer system. Compared to the mobile storage device 14, the confirmation of whether the target data currently stored in the control module 12 is the latest version is easier. The flow shown in FIG. 1B ensures the target data stored into the mobile storage device 14 and the television system 200 to be the latest version. Further, during the whole testing procedure when the data inputted into the television system 200 is repetitively changed, the mobile storage device 14 remains connected to the intermediate module 16, so that repetitive manual plugging in and removal of the mobile storage device 14 between the control module 12 and the television system 200 are eliminated.

It should be noted that, under circumstances that the television system 200 is not built-in with a code for cooperating with the testing procedure, the control module 12 may first write the code into a memory (e.g., a dynamic random access memory (DRAM)) in the television system 200 via an inter-integrated circuit ($I^2C$) bus, so as to enable the television system 200 to perform the foregoing functions of automatically reading the target data from the mobile storage device 14 and generating the response signal.

Figure 2A:
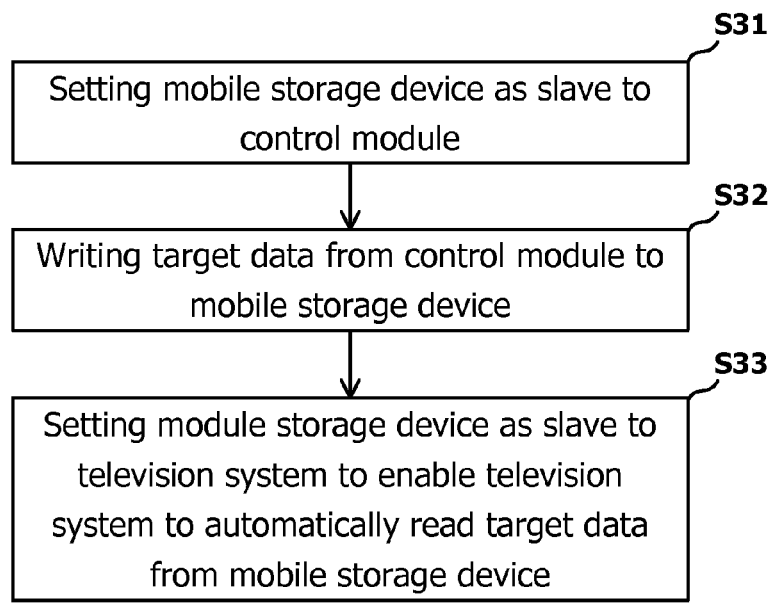
FIG. 2A and FIG. 2B are flowcharts of a testing method according an embodiment of the present invention.

FIG. 2A shows a flowchart of a television system testing method according to an embodiment of the present invention. A mobile storage device is coupled between the television system and a control module. The method begins with Step S31, in which the mobile storage device is set as a subordinate to the control module. In Step S32, a target data is written from the control module to the mobile storage device. In Step S33, the mobile storage device is set as a subordinate to the television system to enable the television system to automatically read the target data from the mobile storage device.

Figure 2B:
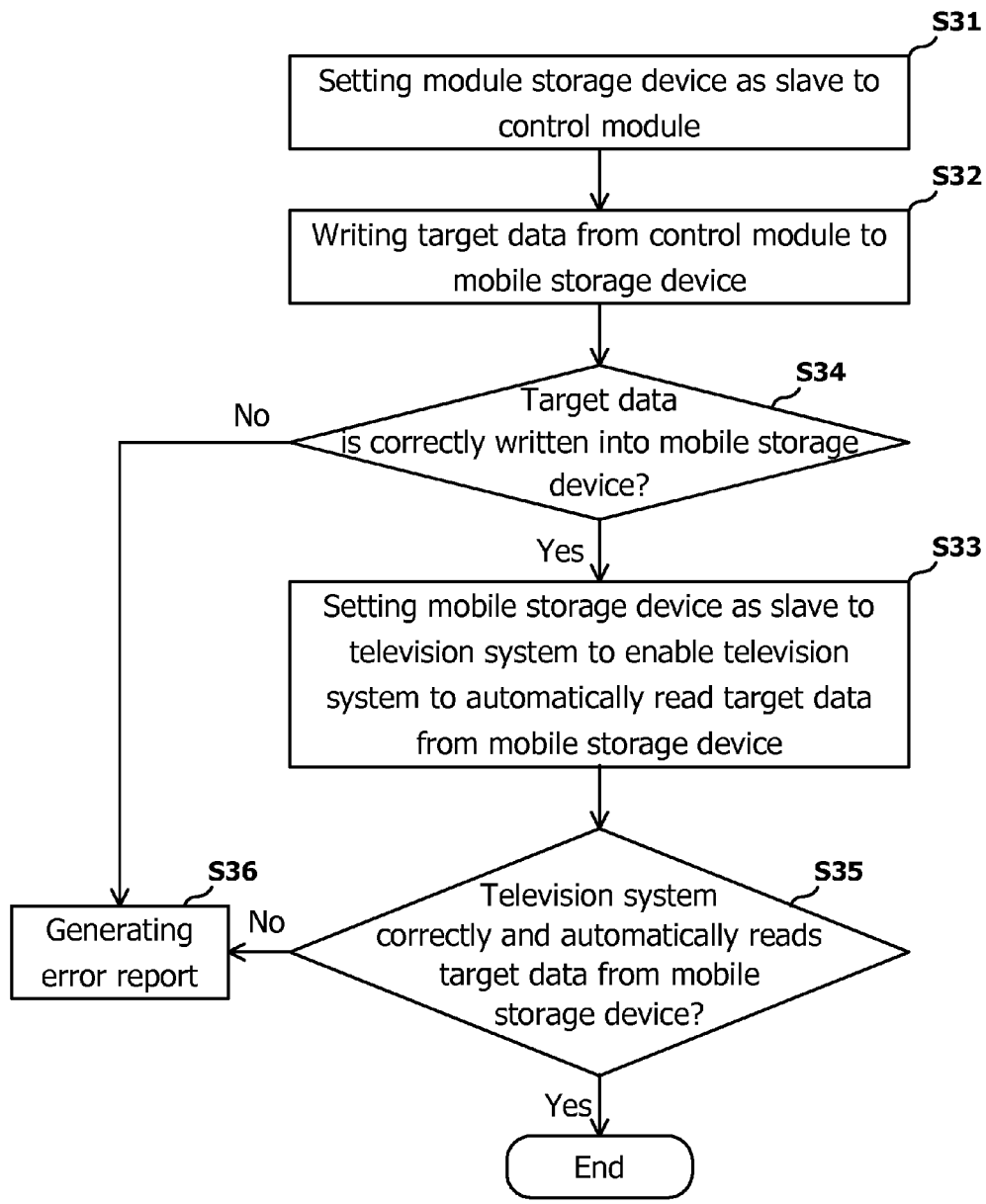

As shown in FIG. 2B, the testing method may further include Steps S34 to S36. In Step s34, it is confirmed whether the target data is correctly written into the mobile storage device. In Step S35, it is confirmed whether the television system is capable of correctly and automatically reading the target data from the mobile storage device. When a determination result of either Step S34 or Step S35 is negative, Step S36 of the testing method is performed to generate an error report. Operation details of the previous embodiment are applicable to the testing method, and shall be omitted herein.

Figure 3A:
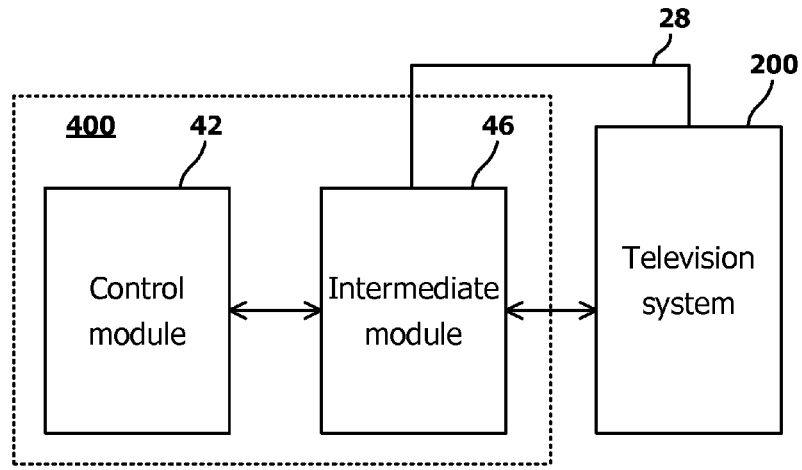
FIG. 3A is a block diagram of a testing apparatus according to another embodiment of the present invention.

FIG. 3A shows a testing apparatus 400 according to an embodiment of the present invention. The testing apparatus 400 includes a control module 42 and an intermediate module 46. The intermediate module 46 is coupled between the control module 42 and the television system 200. A power cord 28 of the television system 200 is coupled to the intermediate module 46. The control module 42 controls the intermediate module 46 to change a power supply status of the power cord 28 for once or for a successive number of times. In practice, the intermediate module 46 may provide an AC power socket having a switch function for plugging in the power cord as well as turning on and off the power supply of the power cord 28.

Figure 3B:
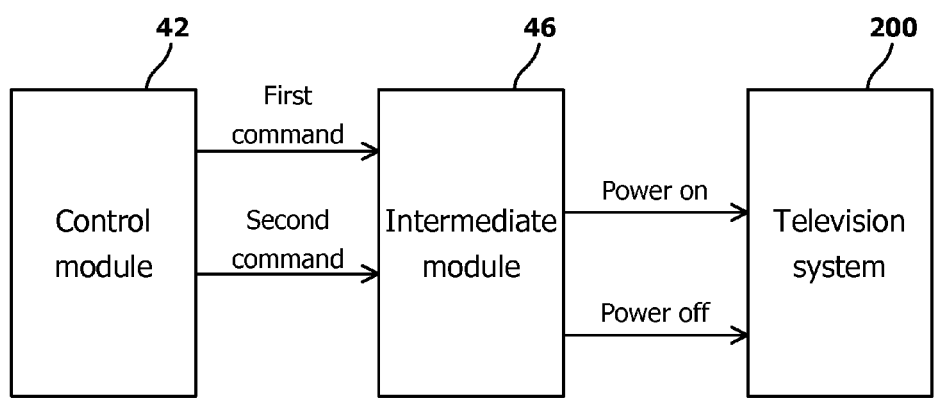
FIG. 3B is an exemplary flow of the testing apparatus.

FIG. 3B shows an exemplary flow of the testing apparatus 400. The control module 42 first sends a first command to the intermediate module 46 to control the intermediate module 46 to activate the power supply, so as to allow the power cord 28 to transmit power to the television system 200. The control module 42 then sends a second command to the intermediate module 46 to control the intermediate module 46 to cut off the power supply, so as to disable the power cord 28 from transmitting power to the television system 200. The first command and the second command may be repeated and alternately executed in order to perform a reliability test on the power on/off function of the television system 200.

Figure 3C:
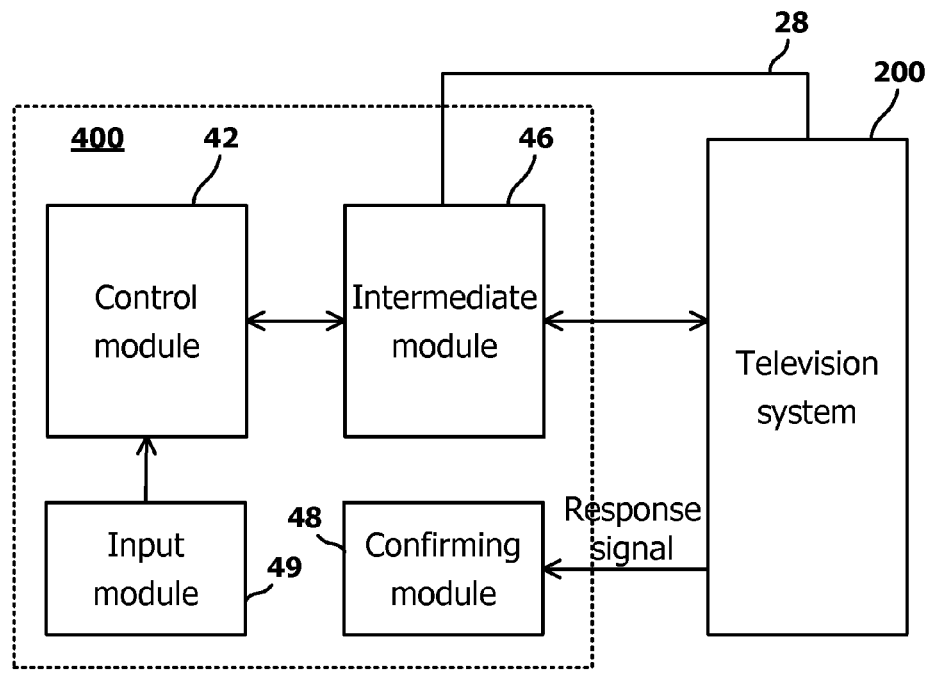
FIG. 3C is the testing apparatus further including a confirming module and an input module according to an embodiment of the present invention.

Referring to FIG. 3C, the testing apparatus 400 may further include a confirming module 48 and an input module 49. The confirming module 48 confirms whether the television system 200 correctly responds to the change of the power supply status. The input module 49 allows the user to input the number of testing times of changing the power supply status or a testing mode (e.g., an interval between powering on and off).

In one embodiment, the confirming module 48 includes a capturing unit (not shown) for capturing a display image of the television system 200. For example, when powered off, the display image of the television system 200 is an almost all-black image. When powered on, the captured result received by the confirming module 48 should change to an image of a program currently played by the television system 200. Thus, by comparing the captured result with a reference image, the confirming module 48 determines whether the power switching function of the television system 200 is functional.

Figure 4:
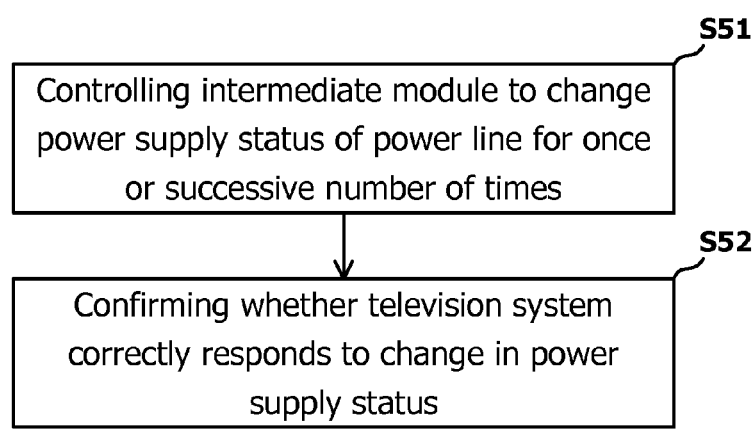
FIG. 4 is a flowchart of a testing method according another embodiment of the present invention.

FIG. 4 shows a television system testing method according to yet another embodiment of the present invention. A power cord of the television system is coupled to an intermediate module. The method begins with Step S51, in which the intermediate module is controlled to change a power supply status of the power cord for once or for a successive number of times. In Step S52, it is confirmed whether the television system correctly responds to the change in the power supply status.

It should be noted that, the functions of the foregoing testing apparatus 100 and testing apparatus 400 may be integrated and implemented by one set of hardware circuit, which generates an overall evaluation report after completing the tests. The processes in FIGS. 2A and 4 may also be integrated into one testing procedure, and further include other types of testing steps. Therefore, compared to a conventional solution, the testing apparatus and testing method of the present invention, by integrating and automating majority of testing procedures, is capable of reducing a large amount of human resources and thus increasing overall testing efficiency.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A testing apparatus for a television system, coupled to a mobile storage device, the testing apparatus comprising:
an intermediate module, coupled to the television system and the mobile storage device, for switching a subordinate status of the mobile storage device;
a control module, coupled to the intermediate module, for controlling the intermediate module to write data into the mobile storage device and to allow the mobile storage device to output the data to the television system, wherein the control module writes data into the mobile storage by steps:
sending a first switch command to the intermediate module to set the mobile storage device to be subordinated to the control module;
receiving a first acknowledgement message from the intermediate module in confirming the first switch command;
sending a write command to the intermediate module to write data into the mobile storage device
receiving a write acknowledgement message; and
sending a second switch command to the intermediate module to set the mobile storage device to be subordinated to the television system; and
a confirming module, for confirming whether the data is correctly read from the mobile storage device and written into the television by receiving a predetermined response signal from the television system to the intermediate module when the television system correctly and automatically reads the data from the mobile storage device;
wherein, when the confirming module does not receive the predetermined response signal or the received predetermined response signal is incorrect, the confirming module determines that the data function of the television system automatically reading data from the mobile storage device has malfunctioned;
wherein, when the subordinate status indicates the mobile storage device is a subordinate to the control module, the control module writes the data from the control module to the mobile storage device via the intermediate module, while the television system is not directly coupled to and unaware of the presence of the mobile storage device; and
wherein, when the subordinate status indicates the mobile storage device is a subordinate to the television system, the television system automatically reads the data from the mobile storage device.

2. The testing apparatus according to claim 1, wherein the data is updated firmware.

3. A testing method for a television system, the television system coupled to a control module, an intermediate module, and a mobile storage device, the method comprising:
sending a first switch command from the control module to the intermediate module for setting the mobile storage device as being subordinate to the control module;
receiving a first acknowledgement from the intermediate module to the control module in confirming the first switch command;
writing data from the control module into the mobile storage device;
receiving writing acknowledgement by the control module;
sending a second switch command from the control module to the intermediate module for setting the mobile storage device as being subordinate to the television system to allow the television system to automatically read the data from the mobile storage device; and
confirming whether the data is correctly read from the mobile storage device and written into the television by receiving a predetermined response signal from the television system when the television system correctly and automatically reads the data from the mobile storage device;
wherein, when no predetermined response signal is received or the received predetermined response signal is incorrect, a determination is made that the function of automatic reading data from the mobile storage device has malfunctioned;
wherein, when the mobile storage device is a subordinate to the control module, the control module writes the data from the control module to the mobile storage device via the intermediate module, while the television system is not directly coupled to and unaware of the presence of the mobile storage device; and wherein, when the mobile storage device is a subordinate to the television system, the television system automatically reads the data from the mobile storage device.

4. The testing method according to claim 3, wherein the data is updated firmware.

* * * * *